United States Patent
Wan et al.

(10) Patent No.: US 8,252,184 B2
(45) Date of Patent: Aug. 28, 2012

(54) METHOD, EQUIPMENT AND SPECIFIC DRAWER FOR MEMBRANE SEPARATION UTILIZING CONCENTRATION POLARIZATION

(75) Inventors: Yinhua Wan, Beijing (CN); Xiangrong Chen, Beijing (CN); Zhiguo Su, Beijing (CN); Guanghui Ma, Beijing (CN); Xiaoguang Jiao, Beijing (CN); Fei Shen, Beijing (CN); Zhanfeng Cui, Oxford (GB)

(73) Assignee: Institute of Process Engineering, Chinese Academy of Sciences, Beijing (CN)

( * ) Notice: Subject to any disclaimer, the term of this patent is extended or adjusted under 35 U.S.C. 154(b) by 271 days.

(21) Appl. No.: 12/443,797

(22) PCT Filed: Mar. 5, 2008

(86) PCT No.: PCT/CN2008/070420
§ 371 (c)(1),
(2), (4) Date: Mar. 31, 2009

(87) PCT Pub. No.: WO2008/116410
PCT Pub. Date: Oct. 2, 2008

(65) Prior Publication Data
US 2010/0044310 A1 Feb. 25, 2010

(30) Foreign Application Priority Data
Mar. 23, 2007 (CN) .......................... 2007 1 0064721

(51) Int. Cl.
*B01D 29/075* (2006.01)
*B01D 33/44* (2006.01)

(52) U.S. Cl. .................. 210/637; 210/416.1; 210/106; 210/159; 210/158; 210/167.09; 210/167.14; 210/321.69; 210/327; 210/396; 210/791; 210/670; 210/636

(58) Field of Classification Search .................. 210/107, 210/637
See application file for complete search history.

(56) References Cited

U.S. PATENT DOCUMENTS
2,038,921 A * 4/1936 Blaufuss ...................... 210/397
(Continued)

FOREIGN PATENT DOCUMENTS
CN 1674974 9/2005
(Continued)

OTHER PUBLICATIONS
Handbook of Separation Process Technology, Chapter 18.2 Reverse Osmosis, John Wiley & Sons, 1987, pp. 826-839.*
International Search Report regarding International Application No. PCT/CN2008/070420 dated Jun. 12, 2008.

*Primary Examiner* — Krishnan S Menon
*Assistant Examiner* — Allison M Gionta
(74) *Attorney, Agent, or Firm* — Harness, Dickey & Pierce, P.L.C.

(57) ABSTRACT

The present invention relates to a membrane separation method and a relevant equipment, in particular to a method and an equipment for membrane separation utilizing concentration polarization during membrane filtration process, especially, to a concentration process and equipment and a drawer special for drawing a concentration polarization layer. The direct removal of the concentration polarization layer from membrane surface not only decreases the adverse influence of concentration polarization on membrane separation but also obtains concentrated retention components, thereby significantly improving the ability to maintain membrane flux, solving the twinborn problems concerning concentration polarization and membrane fouling during the membrane separation process, and achieving a high-efficiency concentration for retention components. The method and equipment of the present invention can be widely applied in various membrane techniques, in particular in a membrane separation process for concentrating biomacromolecule and organic micromolecule products such as sugars, organic acids and polypeptides etc.

17 Claims, 2 Drawing Sheets

U.S. PATENT DOCUMENTS

| | | | | |
|---|---|---|---|---|
| 4,218,314 | A | * | 8/1980 | Schubert et al. ............... 210/652 |
| 5,032,281 | A | * | 7/1991 | Nagamatsu et al. .......... 210/651 |
| 5,985,160 | A | | 11/1999 | DiLeo et al. |
| 7,220,354 | B2 | | 5/2007 | McLaughlin et al. |
| 2004/0238445 | A1 | | 12/2004 | McLaughlin et al. |
| 2005/0139538 | A1 | | 6/2005 | Lazaredes |
| 2007/0193941 | A1 | | 8/2007 | McLaughlin et al. |

FOREIGN PATENT DOCUMENTS

| | | |
|---|---|---|
| CN | 2761253 Y | 3/2006 |
| CN | 2761254 Y | 3/2006 |
| WO | WO-9910088 | 3/1999 |
| WO | WO-2004080510 | 9/2004 |

* cited by examiner

METHOD, EQUIPMENT AND SPECIFIC DRAWER FOR MEMBRANE SEPARATION UTILIZING CONCENTRATION POLARIZATION

TECHNICAL FIELD

The present invention relates to a method and equipment for membrane separation, in particular to a method and equipment as well as a specific drawer for the separation utilizing concentration polarization during membrane separation processes.

BACKGROUND ART

Membrane separation refers to a method for separation, concentration and purification of a raw material by using a selective permeation membrane, in which the components of the raw material at the side of raw material selectively permeate the membrane when there exists a certain driving force (such as pressure difference, concentration difference, potential difference or temperature difference etc.). Different membranes and driving forces are employed in different membrane separation processes. At present, the membrane separation processes that have been industrially used include microfiltration (MF), ultrafiltration (UF), reverse osmosis (RO), dialysis (D), electrodialysis (ED), gas separation (GS), pervaporation (PV) and emulsion liquid membrane (ELM) etc. In addition, there are many novel membrane separation processes under development, such as membrane extraction, membrane distillation, bipolar membrane electrodialysis, membrane split phase, membrane absorption, membrane reaction, membrane control release, membrane biosensor, etc.

As compared to traditional separation methods, the membrane separation technique has the following advantages: (1) High efficiency: since a membrane is selective, some substances can pass through it selectively, while other substances are retained by it. Effective separation, purification and concentration can be performed by selecting and utilizing a suitable membrane; (2) Energy saving: most of membrane separation processes are operated at a room temperature without phase transition of a separated substance, so membrane separation technique is an unit operation with low energy consumption and low cost; (3) Membrane separation processes are simple, easy to be operated and controlled; and (4) There is no environmental pollution during the membrane separation processes.

Therefore, the membrane separation technique has been developed rapidly in recent years, widely applied in petrochemical industry, biological pharmaceutical industry, medical and sanitation fields, metallurgy industry, electronics, energy field, light industry, textile industry, food industry, environmental protection industry, aerospace industry, maritime transport industry and daily life field, and becomes one of the most important means in separation science nowadays.

However, concentration polarization phenomenon generally existing in membrane separation processes is one of main factors affecting membrane flux and causing membrane fouling. Concentration polarization phenomenon refers to a phenomenon that a separation membrane selectively allows some components in a raw material to be separated to pass through but other components to be retained, which results in the enriching of the retention components near to the membrane surface of separation side to form a concentration gradient from the membrane surface to the raw material bulk phase, thereby causing a diffusion of the retained components from the membrane surface to the raw material bulk phase and a decrease of membrane flux.. For example, during membrane separation of a solution, the treated solution convectively flows to membrane surface, and the retained solute accumulates near to the membrane surface, so that the concentration of solute on membrane surface is higher than that in the solution bulk phase, and a concentration gradient from the membrane surface to solution bulk phase is formed, which causes a diffusion of the retained components from the membrane surface to the raw material bulk phase and a decrease of flux. The above phenomenon is called concentration polarization.

Since concentration polarization not only causes the decrease in membrane flux but also aggravates membrane fouling due to the enriching of retention components on membrane surface, concentration polarization is a problem generally to be solved during membrane separation processes. For example, the substances with a high concentration on membrane surface may be removed by tangential flow based on the optimization of membrane module design and of operation conditions to reduce concentration polarization on membrane surface and to maintain membrane flux. However, the methods and equipments for reducing concentration polarization and membrane fouling to maintain membrane flux still need to be developed.

CONTENTS OF THE INVENTION

On the one hand, the present invention provides a membrane separation method, which comprises:
  a) loading a fluid containing retention components and permeation components at a separation side of a separation membrane;
  b) exerting a driving force on the fluid to allow at least part of the permeation components to pass through the separation membrane and reach a permeation side of the separation membrane, thereby a retention components-enriched concentration polarization layer is formed at the separation side of the separation membrane; and
  c) removing at least part of the concentration polarization layer from the separation side.

In some embodiments of the membrane separation method according to the present invention, the fluid is a fluid containing components capable of forming a concentration polarization layer at the separation side of the separation membrane, for examples, said fluid can be a solution, a liquid-solid suspensoid, a liquid-liquid suspensoid, a sol, a gas mixture, a gas-solid suspensoid, a gas-liquid suspensoid, or an aerosol.

In some embodiments of the membrane separation method of the present invention, said retention components refer to any components in the fluid, which can be retained at least partially by the separation membrane, such as one or more solute molecules or ions, solid particles and liquid droplets etc., in particular organic or inorganic solutes, more particularly biomacromolecule such as proteins, nucleic acids and polysaccharides etc., and biomicromolecule such amino acids, nucleotides and monosaccharides etc. Said permeation components refer to any components in the fluid, which can at least partially permeate the separation membrane, such as one or more liquid solvents, carrier gases and components different from the retention components, such as molecules or ions, etc. In some embodiments, said retention components may form a filter cake at the separation side, and/or enter into and block membrane pores, and/or permeate the separation membrane, in addition to the formation of a concentration polarization layer.

In some embodiments of the membrane separation method of the present invention, said separation membrane refers to any of membranes that can be used for membrane separation, such as nanofiltration membranes, ultrafiltration membranes and microfiltration membranes, in particular nanofiltration, ultrafiltration or microfiltration membranes made of celluloses, poly(ether sulfone)s, polysulfones, polyolefins, polyamides, polypiperazidines, metals, glasses or ceramics.

In some embodiments of the membrane separation method of the present invention, said separation membrane may be present in any suitable configuration, such as tabular, plate-and-frame, spiral, tubular or hollow fiber.

In some embodiments of the membrane separation method of the present invention, said separation membrane has a suitable permeation flux, for example, ranging from $1\times10^{-8}$ m/s to $1\times10^{-4}$ m/s, preferably from $2.78\times10^{-7}$ m/s to $1.39\times10^{-4}$ m/s, more preferably from $1.84\times10^{-6}$ m/s to $3.69\times10^{-5}$ m/s.

In some embodiments of the membrane separation method of the present invention, said driving force may be produced by any suitable mode, such as pressure difference, concentration difference, potential difference or temperature difference, in particular pressure difference. For example, a positive pressure is exerted at the separation side of a membrane or a negative pressure is exerted at the permeation side of a membrane by a known means to produce a pressure difference, wherein the positive pressure may be produced at the separation side of a membrane using pump, positive pressure fluid, gravity or centrifugal force etc., while the negative pressure may be produced by a vacuum action or capillary action at the permeation side of a membrane, and thus the permeation components permeate the separation membrane from the separation side to the permeation side under the pressure difference to form a retention components-enriched concentration polarization layer on the membrane surface of the separation side.

In some embodiments of the membrane separation method of the present invention, a transmembrane pressure generated by the driving force produced by a pressure difference can be determined in accordance with the requirements of application and actual demands, for example, it ranges from 0.005 MPa to 10 MPa, preferably from 0.01 MPa to 4 MPa.

In some embodiments of the membrane separation method of the present invention, a step of removing permeation components from the permeation side of the separation membrane is comprised optionally. The step can be implemented by any known method according to specific situations in said embodiments, for example, the permeation components may be removed using a ductwork etc.

In some embodiments of the membrane separation method of the present invention, the thickness of said concentration polarization layer and the concentration of retention components therein can be determined or adjusted based on the property of fluid and each component therein, type of membrane module, kind and specification of membrane, operation conditions including kind and magnitude of driving force and fluid speed on the membrane surface according to specific applications and requirements. For example, the thickness of concentration polarization layer may be approximately predicted by models (such as S. P. Agashiche, Calculation of concentration polarisation in processes of ultrafiltration of non-Newtonian fluids in tubular channel, Separation/Purification Technology 25 (2001) 523-533; S. K. Karode, A new unsteady-state model for macromolecular ultrafiltration, Chemical Engineering Science 55 (2000) 1769-1773; S. Kim, E. M. V. Hoek, Modeling concentration polarization in reverse osmosis processes, Desalination 186 (2005) 111-128; and Mohd. Z. Sulaiman et al., Prediction of dynamic permeate flux during cross-flow ultrafiltration of polyethylene glycol using concentration polarization-gel layer model, Journal of Membrane Science 189 (2001) 151-165), and/or determined by experiments (such as Z. Zhang et al., Use of capacitive microsensors and ultrasonic time-domain reflectometry for in-situ quantification of concentration polarization and membrane fouling in pressure-driven membrane filtration, Sensors and Actuators B 117 (2006) 323-331; and J. C. Chen et al., In situ monitoring techniques for concentration polarization and fouling phenomena in membrane filtration, Advances in Colloid and Interface Science 107 (2004) 83-108 etc.). Hence, in some embodiments, the time, duration and quantity for removing concentration polarization layer can be determined according to a predicted, experimentally detected or real-time detected thickness of the concentration polarization layer and to specific application conditions and requirements.

In some embodiments of the membrane separation method of the present invention, at least part of the concentration polarization layer can be removed by any suitable method in the step c). For example, the at least part of concentration polarization layer may be removed by operations such as drawing, extracting or isolating to make the removed at least part of concentration polarization layer to be separated from said concentration polarization layer and said fluid. In particular, a concentration polarization layer is drawn or extracted using a ductwork; or a concentration polarization layer is isolated from other parts of fluid using a suitable container and then is extracted. In some embodiments, drawing operation may be carried out using a pressure difference between the concentration polarization layer and a drawer. The operation of removing the at least part of concentration polarization layer may be carried out at any place of the concentration polarization layer, in particular, such operation is carried out at a place close to the surface of separation membrane, more particularly, such operation is carried out essentially on the surface of separation membrane. Typically, after being separated from said concentration polarization layer, the removed at least part of concentration polarization layer does not go back to the said fluid to avoid the remixing or back mixing between the removed part of concentration polarization layer and the fluid, which may be advantageous to applications such as membrane concentration. However, in some applications, after being separated from said concentration polarization layer, the removed part of concentration polarization layer may still remix with the fluid, for example, said remixing is conducted at a place other than those at which the membrane separation is carried out. In some embodiments, the fluid treated by the membrane separation method and/or the removed part of concentration polarization layer may be optionally further treated at a place same as or different from those at which membrane separation is carried out.

In some embodiments of the membrane separation method of the present invention, said concentration polarization layer is separated from said separation membrane essentially along a normal direction or a tangential direction or any direction between the normal and tangential direction of the separation membrane.

In some embodiments of the membrane separation method of the present invention, all or part of the steps of said membrane separation are conducted continuously, semi-continuously or intermittently. For example, the operation of removing at least part of the concentration polarization layer may be carried out continuously or intermittently to expediently remove from 0.1% to 99% of the concentration polarization layer continuously or intermittently. For example, as for a continuous drawing operation, when the transmembrane pressure or the permeation flux or the thickness of concentration polarization layer reaches a predetermined value, the concentration polarization layer may be drawn continuously. As for a intermittent drawing operation, when the transmembrane pressure or the permeation flux or the thickness of concentration polarization layer reaches a first predetermined value, the draw of the concentration polarization layer is initiated; when the transmembrane pressure or the permeation flux or the thickness of concentration polarization layer reaches a second predetermined value, the drawing operation stops; and these steps are repeated.

The membrane separation method of the present invention may be employed to reduce concentration polarization and membrane fouling to maintain a membrane flux, as well as to obtain concentrated retention components. Therefore, the membrane separation method of the present invention may be employed in any membrane separation process, which produces concentration polarization, such as membrane concentration, membrane filtration, membrane distillation, membrane extraction or membrane absorption etc.

In some embodiments of the membrane separation method of the present invention, said membrane separation method may be a membrane concentration method, comprising removing a part of the concentration polarization layer from the separation side to obtain concentrated retention components. Said membrane concentration method is particularly suitable for high-efficiency concentration of biomacromolecules due to the rapid formation of concentration polarization layer, high concentration degree and moderate concentration conditions.

In other embodiments of the membrane separation method of the present invention, said membrane separation method may be a membrane filtration method, comprising removing the permeation components form the permeation side to obtain the permeation components with a reduced retention components. Since the quantity of the retention components in concentration polarization layer is reducing, the membrane fouling can be effectively controlled and the membrane flux can be maintained for a long time. Therefore, said membrane filtration method can significantly enhance filtration efficiency and prolong the useful life of the filtration membrane.

On the other hand, the present invention provides a membrane separation equipment comprising a separation membrane and a drawer, in which the drawer is configured to remove at least part of a concentration polarization layer from a separation side of the separation membrane during a membrane separation process. In the present invention, the membrane separation equipment refers to a membrane separation unit, membrane separation setup, membrane separation system, membrane separation device or membrane separation module.

In some embodiments of the membrane separation equipment of the present invention, said membrane separation equipment further has a essentially open or enclosed housing, in which the housing together with the separation membrane are used to isolate the separated fluid from the permeation components. In other embodiments of the membrane separation equipment of the present invention, said membrane equipment has no housing, in which the separation membrane per se is used to isolate the separated fluid from the permeation components, and examples thereof can be situations of using hollow-fiber membranes or tubular membranes.

In some embodiments of the membrane separation equipment of the present invention, said drawer may be located at the separation side or the permeation side, inside the separation membrane or on the separation membrane.

In some embodiments of the membrane separation equipment of the present invention, said drawer together with the separation membrane form a membrane module.

In some embodiments of the membrane separation equipment of the present invention, said drawer comprises a hollow structure having at least one opening which is located inside the concentration polarization layer in the separation side of said separation membrane and allows at least part of the concentration polarization layer to enter into said hollow structure and to be removed.

In some embodiments of the membrane separation equipment of the present invention, said hollow structure having opening of said drawer is a rigid or flexible hollow container. When the opening of said hollow structure is located inside the concentration polarization layer, at least part of the concentration polarization layer is allowed to enter into said hollow structure and to be removed.

In some embodiments of the membrane separation equipment of the present invention, said drawer further comprises a channel that connects said hollow structure and the outside of said concentration equipment and allows the concentration polarization layer entering into said hollow structure to be separated from said concentration equipment.

In some embodiments of the membrane separation equipment of the present invention, the configuration of said opening makes said concentration polarization layer be separated from said separation membrane essentially along the normal or tangential direction of the separation membrane or any direction between the normal direction and the tangential direction.

In some embodiments of the membrane separation equipment of the present invention, the distance and relative position between said drawer and said separation membrane are fixed or adjustable. For example, said drawer is fixed or movable with respect to the separation membrane, while the opening of the hollow structure is fixedly located inside the concentration polarization layer. For another example, said drawer is fixed or movable with respect to the separation membrane, while the opening of the hollow structure is movable along vertical direction and parallel direction to the surface of said separation membrane respectively or simultaneously with respect to the membrane, which allows said opening to enter inside the concentration polarization layer when needed to draw the concentration polarization layer at different positions, and to leave the concentration polarization layer when needed.

In some embodiments of the membrane separation equipment of the present invention, the opening of the hollow structure of the drawer may face toward any direction with respect to the separation membrane, in particular directly face toward the separation membrane.

In some embodiments of the membrane separation equipment of the present invention, the section with opening of the hollow structure of said drawer is present in an essentially planar, cruciate, spiral, latticed or suspending needle shape, or a combination thereof. In some embodiments, said section as a whole may substantially match with the surface of the specific separation membrane. For example, as for a tabular membrane, said section as a whole is in an essentially planar shape, while as for a tubular membrane, said section as a whole is in an annular shape. However, in any situation, a part of said section may be presented in other shapes as stated above or a combination thereof.

In some embodiments of the membrane separation equipment of the present invention, the section with opening of the hollow structure of said drawer is essentially parallel to the surface of said separation membrane, i.e. the shortest distances between said section and said separation membrane are essentially equal at everyplace.

In some embodiments of the membrane separation equipment of the present invention, the opening of hollow structure of said drawer may be holes in any suitable shape, such as essentially round, slit, polygonal or abnormal shape.

In some embodiments of the membrane separation equipment of the present invention, the hollow structure of said drawer has at least one opening, and the number of openings may be determined according to the material, size and shape of the hollow structure, the size and shape of the openings, the size and shape of the separation membrane, the property of retention components, and other specific application conditions and parameters. When the hollow structure has more than one opening, these openings may be located regularly or randomly on the hollow structure of said drawer, in particular they are located on the surface of hollow structure of said drawer that faces toward said separation membrane.

In some embodiments of the membrane separation equipment of the present invention, the opening of the hollow structure of said drawer may have any suitable size, such as from 0.01 to 5 mm, preferably from 0.1 to 2.0 mm, more preferably from 0.1 to 0.5 mm.

In some embodiments of the membrane separation equipment of the present invention, all or part of said drawer may be rigid, elastic or flexible. Based on different separation membranes, fluids and operation conditions, all or part of said drawer may be made of any suitable material selected from metals, such as steel, copper, aluminum, titanium, nickel, gold, silver, etc., or alloys thereof; plastics, such as thermoplastics, thermosetting plastics, engineering plastics, or composites thereof; rubbers, such as natural rubber, synthetic rubbers, elastomers, or composites thereof; or a combination thereof.

In some embodiments of the membrane separation equipment of the present invention, said fluid is a fluid containing components capable of forming a concentration polarization layer at the separation side of the separation membrane, for examples, said fluid can be a solution, a liquid-solid suspensoid, a liquid-liquid suspensoid, a sol, a gas mixture, a gas-solid suspensoid, a gas-liquid suspensoid, or an aerosol.

In some embodiments of the membrane separation equipment of the present invention, said retention components refer to any components in the fluid, which can be retained at least partially by the separation membrane, such as one or more solute molecules or ions, solid particles and liquid droplets etc., in particular organic or inorganic solutes, more particularly biomacromolecule such as proteins, nucleic acids and polysaccharide etc. and biomicromolecule such amino acids, nucleotides and monosaccharides etc. Said permeation components refer to any components in the fluid, which can at least partially permeate the separation membrane, such as one or more liquid solvents, carrier gases, and components which differ from the retention components such as molecules or ions. In some embodiments, said retention components may form a filter cake at the separation side and/or enter into and block membrane pores and/or permeate the separation membrane, in addition to the formation of a concentration polarization layer.

In some embodiments of the membrane separation equipment of the present invention, said separation membrane refers to any membrane, which can be used for membrane separation, such as nanofiltration membrane, ultrafiltration membrane and microfiltration membrane, in particular nanofiltration, ultrafiltration or microfiltration membrane made of celluloses, poly(ether sulfone)s, polysulfones, polyolefins, polyamides, polypiperazidines, metals, glasses or ceramics.

In some embodiments of the membrane separation equipment of the present invention, said separation membrane may be present in any suitable configuration, such as tabular, plate-and-frame, spiral, tubular or hollow fiber shape.

In some embodiments of the membrane separation equipment of the present invention, said separation membrane has a suitable permeation flux, for example, ranging from $1 \times 10^{31}$ 8 m/s to $1 \times 10^{-4}$ m/s, preferably from $2.78 \times 10^{-7}$ m/s to $1.39 \times 10^{-4}$ m/s, more preferably from $1.84 \times 10^{-6}$ m/s to $3.69 \times 10^{-5}$ m/s.

In some embodiments of the membrane separation equipment of the present invention, the concentration polarization layer is formed at the separation side of the separation membrane under the gravity of a fluid per se. In this case, no additional means is used in said membrane separation equipment for exerting a driving force on said fluid.

In some embodiments of the membrane separation equipment of the present invention, an additional means is used in said membrane separation equipment for exerting a driving force on said fluid to form a concentration polarization layer at the separation side of the separation membrane. Said driving force may be produced by any suitable means, such as a means causing a pressure difference, a concentration difference, a potential difference or a temperature difference, in particular a pressure difference between the separation side and the permeation side. In particular, a positive pressure is exerted on the separation side of the membrane or a negative pressure is exerted on the permeation side of the membrane by a known means to produce a pressure difference, wherein the positive pressure may be produced using pump, positive pressure fluid or centrifugal force etc. at the separation side, while the negative pressure may be produced by a vacuum means at the permeation side. A concentration difference may be produced by means of evaporation, adsorption or dilution using a known means. A potential difference may be produced by exerting a direct current between two sides of a membrane using a known means to make the charged ions or molecules permeate the membrane and migrate to the electrodes at two sides, thereby forming a concentration polarization boundary layer at each side of the membrane. A temperature difference may be produced by a means capable of controlling the fluids of both sides at different temperatures, such as heater, cooler or heat exchanger.

In some embodiments of the membrane separation equipment of the present invention, said membrane separation equipment is a dead-end filtration equipment, comprising a dead-end filtration cell, a filtration membrane as a separation membrane and a drawer for drawing a concentration polarization layer, wherein said filtration membrane is located at the bottom of the dead-end filtration cell, the drawer is located in the dead-end filtration cell, one end of said drawer is located outside of the dead-end filtration cell, the other end of said drawer is a hollow structure essentially in planar, cruciate, spiral, latticed, suspending needle or other shape, is essentially parallel to the surface of said filtration membrane, and is located inside the concentration polarization layer on the filtration membrane surface, wherein said hollow structure has at least one opening on one end near to the filtration membrane surface, and the at least one opening is preferably one or more holes having a diameter ranging from 0.01 to 5 mm, preferably ranging from 0.1 to 0.5 mm.

In some embodiments of the membrane separation equipment of the present invention, said membrane separation equipment is a plate-and-frame filtration equipment comprising plate membrane elements for separation and drawers for drawing concentration polarization layers, wherein said plate membrane elements are in parallel and each of the drawers for drawing concentration polarization layer is configured in close proximity to the surface of one of said plate membrane elements, and each of said drawers has a plate latticed hollow structure having at least one opening on a side thereof near to the filtration membrane surface, the at least one opening is preferably one or more holes having a diameter ranging from 0.01 to 5 mm, preferably ranging from 0.1 to 0.5 mm, and each of the drawers is fluidly communicated with a hollow pipe going outside the concentration equipment.

In some embodiments of the membrane separation equipment of the present invention, said membrane separation equipment is a plate-hydraulic static press filtration equipment, comprising a container, plate membrane filtration elements for separation, and drawers for drawing concentration polarization layers, wherein one or more parallel palate membrane elements are configured in said container and each of the drawers for drawing concentration polarization layer is configured in close proximity to the surface of one of said plate membrane elements, each of said drawers is a hollow structure that is present in essentially planar, cruciate, spiral, latticed, suspending needle or other shape and has at least one opening on a side thereof near to the filtration membrane surface, the at least one opening is preferably one or more holes having a diameter ranging from 0.01 to 5 mm, preferably ranging from 0.1 to 0.5 mm, and each of the drawers is fluidly communicated with a hollow pipe going outside the concentration equipment.

In some embodiments of the membrane separation equipment of the present invention, said membrane separation equipment is a plate- suction equipment comprising a container, plate membrane filtration elements for separation, and drawers for drawing concentration polarization layers, wherein one or more parallel plate membrane elements are configured in said container, and each of the drawers for drawing concentration polarization layer is configured in close proximity to the surface of one of said plate membrane elements, wherein each of said drawers is a hollow structure that is present in essentially planar, cruciate, spiral, latticed, suspending needle or other shape and has at least one opening on a side thereof near to the filtration membrane surface, the at least one opening is preferably one or more holes having a diameter ranging from 0.01 to 5 mm, preferably ranging from 0.1 to 0.5 mm, and each of the drawers is fluidly communicated with a hollow pipe going outside the concentration equipment.

In further another aspect, the present invention provides a drawer for drawing a concentration polarization layer from a separation side of a separation membrane during separation process, in which the drawer comprises a hollow structure having at least one opening, and the drawer is configured to make said opening be operably located inside the concentration polarization layer at the separation side of said separation membrane and operably allow at least part of the concentration polarization layer to pass through said opening and enter into said hollow structure, thereby removing at least part of the concentration polarization layer.

In some embodiments of the drawer of the present invention, said drawer further comprises a channel fluidly communicating said hollow structure, and the configuration of the channel allows the concentration polarization layer entering into said hollow structure to leave said hollow structure.

In some embodiments of the drawer of the present invention, said drawer together with the separation membrane form a membrane module.

In some embodiments of the drawer of the present invention, the configuration of said opening allows said concentration polarization layer to be separated from said separation membrane essentially along the normal or tangential direction of the separation membrane, or any direction between the normal direction and the tangential direction.

In some embodiments of the drawer of the present invention, said hollow structure is a rigid or flexible hollow container.

In some embodiments of the drawer of the present invention, said drawer further comprises a connection means, and the configuration of said connection means allows the distance and the relative position between said drawer and said separation membrane to be fixed or alterable. For example, said connection means is a bracket, cantilever, hinge, rail or lever, after being configured, it allows said drawer to be fixed or movable with respect to the separation membrane. Therefore, the opening of said hollow structure is fixed and located inside the concentration polarization layer all the time with respect to said separation membrane, or said opening is operably movable along the vertical direction and parallel direction with respect to the surface of said separation membrane separately or simultaneously, which allows said opening to enter inside the concentration polarization layer when the draw of concentration polarization layer at different positions is necessary, and to leave the concentration polarization layer when needed.

In some embodiments of the drawer of the present invention, the opening of the hollow structure of the drawer may face toward any direction with respect to the separation membrane, in particular directly face toward the separation membrane.

In some embodiments of the drawer of the present invention, the section with opening of the hollow structure is present in essentially planar, cruciate, spiral, latticed, suspending needle shape, or a combination thereof, wherein said opening is located on the most projecting position, lateral position or cavate position of said section. For example, as for a tabular membrane, said section as a whole is essentially in planar shape, while as for a tubular membrane, said section as a whole is in annular shape. However, in any situation, a part of said section may have other abovementioned shapes or a combination thereof.

In some embodiments of the drawer of the present invention, the section with opening of the hollow structure is essentially parallel to the surface of said separation membrane, i.e. the shortest distances between said section and said separation membrane are essentially equal at everyplace.

In some embodiments of the drawer of the present invention, the section with opening of the hollow structure as a whole may substantially match with the surface of the specific separation membrane. For example, as for a plate membrane, said section as a whole is essentially in planar shape, while as for a tubular membrane, said section as a whole is in annular shape. However, in any situation, a part of said section may have other abovementioned shapes or a combination thereof.

In some embodiments of the drawer of the present invention, said drawer may essentially cover at least part of the separation surface of the separation membrane in a fixed or movable manner. In other embodiments of the drawer of the present invention, said drawer may cover substantially the whole separation surface of the separation membrane in a fixed or movable manner, i.e. the opening of the hollow structure of said drawer may essentially reach the whole separation surface of said separation membrane. However, in further embodiments of the drawer of the present invention, said opening may reach at least part of the separation surface of said separation membrane.

In some embodiments of the drawer of the present invention, the at least one opening of the hollow structure of said drawer may be a hole in any suitable shape such as essential round, slit, polygonal or abnormal shape.

In some embodiments of the drawer of the present invention, the hollow structure of said drawer has at least one opening, and the number of opening may be determined according to the material, size and shape of the hollow structure of the drawer, the size and shape of the opening, the size and shape of the separation membrane, the property of retention components, and other specific application conditions and parameters. When the hollow structure has more than one opening, these openings may be located regularly or randomly on the hollow structure of said drawer, for example, they are located on the surface of the hollow structure of said drawer that faces toward said separation membrane.

In some embodiments of the drawer of the present invention, the opening of the hollow structure of said drawer may have any suitable size, such as from 0.01 to 5 mm, preferably from 0.1 to 2.0 mm, more preferably from 0.1 to 0.5 mm.

In some embodiments of the drawer of the present invention, all or part of said drawer may be rigid, elastic or flexible. Based on different separation membranes, fluids and operation conditions, all or part of said drawer may be made of any suitable material selected from metals such as steel, copper, aluminum, titanium, nickel, gold, silver, etc., or alloy thereof; plastics, such as thermoplastics, thermosetting plastics, engineering plastics or composites thereof; rubbers, such as natural rubber, synthetic rubbers, elastomers or composites thereof; or a combination thereof.

In some embodiments of the drawer of the present invention, said drawer is made of a silicone rubber by a microprocessing technique.

In other embodiments of the present invention, unless otherwise stated, any technical solution as stated above and the technical features thereof can be applied singly or in any combination, which is obvious for a person skilled in the art who has read the present invention.

The present invention will be further illustrated by the concentration of biomacromolecules using ultrafiltration, but will not be restricted thereby. Herein, the membrane separation may also be called filtration, membrane filtration, ultrafiltration, concentration, membrane concentration or ultrafiltration concentration, the concentration polarization layer may also be called concentrate liquid, the fluid may also be called solution, material liquor or raw material liquor, the retention component may also be called solute, the membrane separation equipment may also be called equipment or filtration equipment, and the separation membrane may also be called filtration membrane or membrane element.

Ultrafiltration concentration as a membrane separation technique can be used to separate substances having a molecular weight ranging from 1,000 to 1000,000, has no phase transition in separation process, can be carried out under moderate separation conditions, and can maintain the activity of biomacromolecules, so that it is specifically suitable for the concentration and desalinization of biological products such as proteins, polysaccharides, enzymes, nucleic acids, DNAs and monoclonal antibodies. In addition, since ultrafiltration concentration has advantages of low cost, simple operation, easy to be scaled up and high recovery rate, it is widely applied in biotechnological industry. A dead-end filtration technology or a cross-flow filtration technology has been generally employed in ultrafiltration concentration process. Dead-end filtration is similar to sand filtration, in which material liquor passes through the surface of a membrane vertically, all retained substances accumulate on the surface of membrane, while solvent and micromolecule substances permeate the membrane. Since the retained substances accumulate on the membrane surface continuously, the total resistance of filtration increases continuously, which results in a severe membrane fouling and a gradual decrease in membrane flux. Consequently, the membrane has to be cleaned frequently. When a cross-flow filtration technology is employed, the bulk phase of a material liquor flows in parallel with the membrane surface, the permeation liquid permeates the membrane vertically, and the material liquor with a high tangential velocity can take the substances deposited on membrane surface away, thereby slowing the speed of increase in filtration resistance. However, the application of cross-flow filtration to shear-sensitive biomacromolecules is restricted due to its high tangential velocity of material liquor on the membrane surface. It can be seen that whatever filtration mode is employed, membrane fouling cannot be avoided.

The main factors affecting concentration polarization and concentration polarization layer during ultrafiltration process include transmembrane pressure, filtration mode, feeding rate and properties of solution such as pH value, ionic strength, diffusion coefficient of solute and viscosity of solution etc. The concentration of solute in a concentration polarization layer may be hundreds times higher than that in bulk phase by adjusting these factors, and even the concentration of solute may be higher than the dissolubility of the solute in the solvent, thus resulting in solute precipitating on membrane surface. A great number of studies show that a relatively stable concentration polarization layer may be formed within one or several minutes.

The membrane separation method and equipment provided by the present invention can be used to concentrate biomacromolecules and organic micromolecules (such as saccharides, organic acids and polypeptides etc.) in order to overcome the shortcomings of the conventional ultrafiltration concentration process, such as severe membrane fouling, easy to inactivate biomacromolecules, frequent cleaning of membrane and difficult to operate continuously. etc.. The method comprises the adjustment of the thickness of concentration polarization layer on membrane surface and the concentration and distribution of solute in the concentration polarization layer by controlling the operation conditions, such as permeation flux, concentration of material liquor, drawing rate and transmembrane pressure etc., to obtain optimal concentration effects. Wherein, the permeation flux of a filtration membrane may range from $1.84 \times 10^{-6}$ m/s to $3.69 \times 10^{-5}$ m/s, the concentration of a material liquor may range from 1.0 mg/L to 1000 mg/L, the drawing rate may depend on the properties of raw material liquor and concentration requirements and be ½ to 1/1000 of the flux of raw material liquorfed into the membrane concentration equipment, and the transmembrane pressure may range from 0.01 MPa to 4 MPa.

Said biomacromolecules include proteins, polypeptide, amino acids, polysaccharides, RNAs and deoxyribonucleic acids etc, and said organic micromolecules include sugar, organic acids and polypeptides etc.

In the present invention, the equipments useful for a membrane filtration process utilizing concentration polarization to concentrate biomacromolecules include but are not limited to: dead-end filtration equipment, plate-and-frame cross-flow filtration equipment, plate-hydraulic static press filtration equipment and plate-suction filtration equipment, while the equipments useful for a membrane filtration process to concentrate organic micromolecules such as sugar, organic acids and polypeptides etc. include but are not limited to: dead-end filtration equipment and plate-and-frame cross-flow filtration equipment.

Said dead-end filtration equipment comprises: a dead-end filtration cell, a filtration membrane, a drawer for drawing concentrated liquid, pressure sensors, a feeding pump, and an injection pump or a constant flow pump. A tabular filtration membrane is located on the bottom of the dead-end filtration cell, and the drawer for drawing concentrated liquid is located in the dead-end filtration cell, wherein one end of said drawer extends outside the dead-end filtration cell and connects with the injection pump or constant flow pump, and the other end of said drawer is a hollow structure in cruciate or spiral shape and is parallel and close to the filtration membrane surface, wherein said hollow structure has a plurality of openings on a side thereof near to the filtration membrane surface. A raw material inlet is on the top of the dead-end filtration cell, and a permeation liquid outlet is under the filtration membrane in the dead-end filtration cell.

Said dead-end filtration cell is a tabular membrane filter and is designed as a short and stout device, and a pressure sensor is set at the raw material side.

A pipeline accompanied with a pressure sensor is mounted on the raw material inlet, and connects with the feeding pump.

Said openings have a diameter ranging from 0.1 to 0.5 mm.

Said drawer for drawing the concentrated liquid is made of a hollow plastic or silicone pipe having an external diameter ranging from 0.5 to 1.5 mm by a microporcessing technique, and its one end is a hollow pipe structure in cruciate or spiral shape and has a plurality of holes with a diameter ranging from 0.1 to 0.5 mm on a side thereof near to the filtration membrane surface. Said drawer for drawing the concentrated liquid connects with the injection pump or constant flow pump outside the filtration cell to exactly draw the concentrated liquid at a desired flux from the dead-end filtration cell. According to the properties of biomacromolecules and organic micromoelcules to be concentrated, the filtration membrane of the present invention is typically selected from microfiltration membrane, ultrafiltration membrane or nanofiltration membrane made of celluloses, poly(ether sulfone)s, polysulfones, polyamides or polypiperazidines etc.

Said plate-and-frame cross-flow filtration equipment comprises: plate membrane elements, drawers for drawing concentrated liquid, pressure sensors, a feeding pump, an injection pump or a constant flow pump and cut-off valves. The plate-and-frame cross-flow filtration equipment contains a plurality of parallel plate membrane elements, and a drawer for drawing concentrated liquid is configured in close proximity to the surface of each of said plate membrane elements. Each of said drawers has a plate latticed hollow structure having a plurality of openings with a diameter ranging from 0.1 to 5 mm at a side thereof near to the filtration membrane surface and connects with a hollow pipe at one end thereof. After the hollow pipe of each drawer is connected in parallel, it extends outside the plate-and-frame cross-flow filtration equipment and connects with the injection pump or constant flow pump. A raw material inlet is set on one side of the plate-and-frame cross-flow filtration equipment, a pipeline accompanied with a cut-off valve and a pressure sensor is mounted on the raw material inlet, wherein said pipeline connects with the feeding pump. A material liquid or circulating liquid outlet is on the other side of the plate-and-frame cross-flow filtration equipment, and the outlet connects with a pipeline accompanied with a cut-off valve, wherein said pipeline connects with a raw material tank. When the equipment is run, the cut-off valve in said pipeline shuts off; when the membrane need cleaning, the valve opens up for cross-flow cleaning. A permeation liquid outlet is on each of the plate membrane elements. After the permeation liquid from each outlet is connected in parallel, it is discharged from the plate-and-frame cross-flow filtration equipment.

Said drawer for drawing concentrated liquid is made of a hollow plastic or silicone pipe having an external diameter ranging from 0.5 to 1.5 mm by a microporcessing technique, and it is a plate-latticed hollow structure having a plurality of openings with a diameter ranging from 0.1 to 0.5 mm at a side thereof near to the filtration membrane surface. An end of said drawer connects with a hollow pipe to discharge the concentrated liquid.

According to the properties of biomacromolecules and organic micromoelcules to be concentrated, the filtration membrane of the present invention is typically selected from microfiltration membrane, ultrafiltration membrane or nanofiltration membrane made of celluloses, poly(ether sulfone)s, polysulfones, polyamides or polypiperazidines etc.

Said plate-hydraulic static press filtration equipment comprises: a high-level feed tank, a membrane filtration tank, a liquid level meter, plate membrane elements, drawers for drawing concentrated liquid, pressure sensors, a feeding pump, an injection pump or a constant flow pump and cut-off valves. A plurality of parallel palate membrane elements are configured in the membrane filtration tank and a drawer for drawing concentrated is configured in close proximity to the surface of each of said plate membrane elements. Each of said drawer has a plate latticed hollow structure having a plurality of openings with a diameter ranging from 0.1 to 5 mm at a side thereof near to the filtration membrane surface and connects with a hollow pipe. One end of each of said drawer connects with a hollow pipe. After the hollow pipe of each drawer is connected in parallel, it extends outside the plate-hydraulic static press filtration equipment and connects with the injection pump or constant flow pump. A permeation liquid outlet is on each of the plate membrane elements, and the permeation liquid outlets are connected with each other in parallel, and then fluidly connected with a pipeline accompanied with a pressure sensor and a cut-off valve. A transmembrane pressure of permeation liquid is provided by a hydrostatic water head controlled by the liquid level meter of the membrane filtration tank. A raw material inlet is configured on the membrane filtration tank, and the inlet connects with a pipeline accompanied with a cut-off valve and a high-level feed tank. The structure of the drawer for drawing concentrated liquid and the selection of filtration membrane are identical to those described for a plate cross-flow filtration equipment.

Said plate suction filtration equipment comprises: a membrane filtration tank, a liquid level meter, plate membrane elements, drawers for drawing concentrated liquid, pressure sensors, a feeding pump, an injection pump or a constant flow pump, a suction pump and cut-off valves. A plurality of parallel palate membrane elements are configured in the membrane filtration tank and a drawer for drawing concentrated liquid is configured in close proximity to the surface of each of said plate membrane elements. Each of said drawer has a plate latticed hollow structure having openings with a diameter ranging from 0.1 to 5 mm at a side thereof near to the filtration membrane surface and connects with a hollow pipe. One end of each of said drawer connects with a hollow pipe. After the hollow pipe of each drawer is connected in parallel, it extends outside the plate suction filtration equipment and connects with the injection pump or constant flow pump. A permeation liquid outlet is configured on each of plate membrane elements, and the permeation liquid outlets are connected with each other in parallel, and then fluidly connected with a pipeline accompanied with a pressure sensor, a cut-off valve and a suction bump. A raw material inlet is configured on the membrane filtration tank, and the inlet connects with a pipeline accompanied with a cut-off valve and a feeding pump. The structure of the drawer for drawing concentrated liquid and the selection of filtration membrane are identical to those described for a plate cross-flow filtration equipment.

As compared with a conventional ultrafiltration concentration process, the method for concentrating biomacromolecules and organic micromolecules utilizing concentration polarization according to the present invention has the following outstanding characteristics and advantages:
(1) By utilizing the concentration polarization, a good effect of enriching a solute is obtainable even if the concentration of a solute in bulk phase is relatively low, thereby greatly enhancing the concentration rate and efficiency.
(2) During the concentration process, the concentrated liquid is discharged from the membrane filtration equipment, so that the potential membrane fouling substances together with the concentrated liquid are discharged from the membrane unit, thereby effectively reducing the potentiality of membrane fouling and greatly decreasing the frequency of cleaning membrane. Therefore, the double functions of concentrating solute and slowing membrane fouling are obtained.
(3) The equipment, technology and operation of the membrane concentration of the present invention are simple, and continuous or semi-continuous operation can be realized and the service life of the membrane further increased at the same time.
(4) The concentration process is performed without shearing force or under a low shearing force, thereby largely reducing energy consumption and effectively decreasing the risk of inactivation and denaturation of biomacromolecules caused by shearing force, therefore the method of the present invention is especially suitable for the concentration of shear-sensitive biomacromolecules.

In the present invention, a concentration polarization layer is directly removed from a membrane surface, which not only decreases the adverse influences of concentration polarization on membrane separation but also obtains a highly concentrated retention components, thereby significantly improving the ability to maintain membrane flux, lessening concentration polarization and membrane fouling during membrane separation process, and achieving the high concentration of the retention components.

In the present invention, the term "fluid" should be interpreted in the broadest sense, which includes but is not limited to a gas, a liquid, a colloid, a solution, a molecular solution, a liquid-solid suspensoid, a liquid-liquid suspensoid, a sol, a gas mixture, a gas-solid suspensoid, a gas-liquid suspensoid, an aerosol, or a combination thereof, and is a fluid containing components capable of forming a concentration polarization layer at the separation side of a separation membrane.

In the present invention, the term "retention component" should be interpreted as the fluid component that cannot essentially permeate a separation membrane, and the term "permeation component" as the fluid component that can essentially permeate a separation membrane. That is to say, even if the "retention component" can permeate a separation membrane, its permeation rate is far lower than that of the "permeation component", thereby enriching the "retention component" at separation side.

In the present invention, the term "membrane separation" refers to an operation or process for reducing or removing one or more components in a raw material using a selective permeation membrane to increase the proportion or concentration of other one or more components in the raw material.

In the present invention, the term "concentration polarization" refers to a phenomenon that a separation membrane selectively allows some components in a raw material to pass through but other components to be retained, which results in the enriching of the retention components near to the membrane surface of separation side to form a concentration gradient from membrane surface to raw material bulk phase. In theory, any boundary layer in which a concentration gradient of retention component from membrane surface to raw material bulk phase exists may be called "concentration polarization layer".

EXAMPLES

The present invention is further illustrated in conjunction with the following examples, while the protection scope as claimed in the present invention is not limited to these examples.

Example 1

Figure 1:
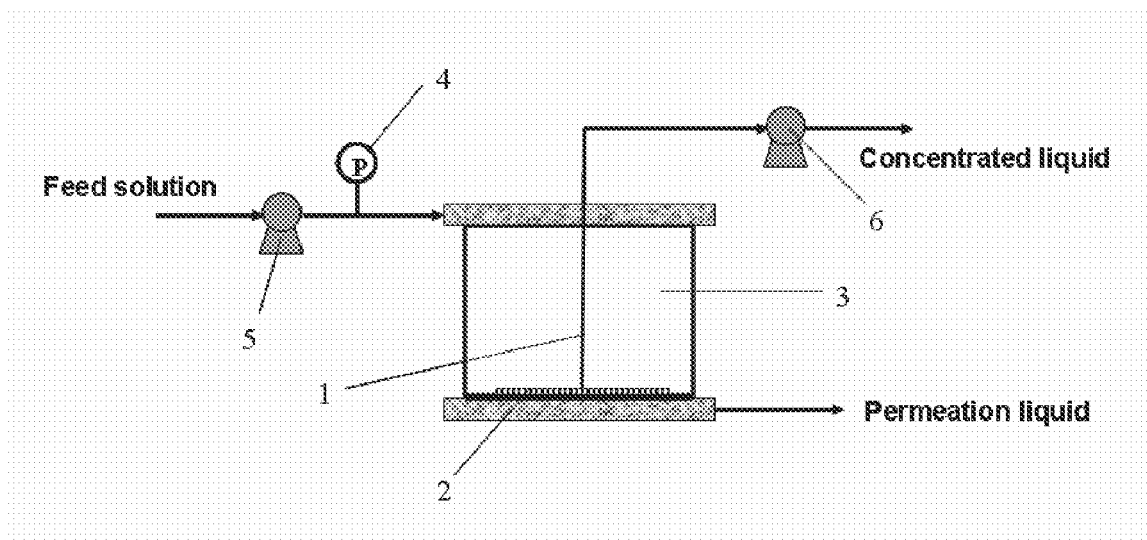
FIG. 1 is a schematic diagram of a dead-end membrane filtration device for concentrating biomacromolecules and organic micromolecules utilizing concentration polarization.

Turning to FIG. 1, the equipment for a dead-end membrane filtration process of concentrating biomacromolecules and organic micromolecules utilizing concentration polarization comprised: a dead-end filtration cell 3, a filtration membrane 2, a drawer 1 for drawing a concentrated liquid, a pressure sensor 4, a feeding pump 5, and an injection pump or constant flow pump 6.

The dead-end filtration cell 3 had an effective membrane area of 4.45 $cm^2$ and a volume of 6.7 mL. The tabular filtration membrane 2 was located on the bottom of the dead-end filtration cell, wherein the filtration membrane was Ultracel PL ultrafiltration membrane of regenerated cellulose with a molecular weight cut-off of 10 KD and a high recovery rate (Millipore Company). The drawer 1 made of a hollow plastic or silicone pipe having an external diameter ranging from 0.5 to 1.5 mm was configured on the filtration membrane surface, wherein one end of said drawer extended outside the dead-end filtration cell 3 and was connected with the injection pump 6, and the other end of said drawer connected with a cruciate hollow pipe which communicated with the main pipe of the drawer. The cruciate hollow pipe was parallel and in close proximity to the filtration membrane surface and had several holes with a diameter ranging from 0.1 to 0.5 mm. A raw material inlet was on the top of the dead-end filtration cell 3. A pipeline accompanied with the pressure sensor 4 was configured on the raw material inlet. The pipeline connected with the feeding pump 5. A permeation liquid outlet was set at the lower part of the dead-end filtration cell 3 under the filtration membrane.

A feed solution containing 0.5 g/L of bovine serum albumin (BSA) (Mb=68 KD, purity>98%) was fed continuously into the dead-end filtration cell. The permeation flux of the filtration membrane was $3.745 \times 10^{-6}$ m$^3$/(m$^2$·s) (0.1 mL/min). After the feed solution had been filtrated and concentrated for 1 hour, the injection pump run to continuously draw the concentrated BAS solution in the concentration polarization layer by the drawer for drawing the concentrated liquid near to the filtration membrane surface at a drawing rate of about 300 μL/h. The permeation liquid was discharged from the outlet under the filtration membrane in the dead-end filtration cell.

The results obtained from a conventional dead-end filtration concentration (i.e. a dead-end filtration method without drawing the concentrated liquid) were compared with the results obtained from the membrane concentration method of the present invention. The results showed that: after continuous filtration concentration operation for 6.5 hours, the concentration of BSA in the concentrated liquid obtained from the method of the present invention was 6.6 g/L and 13.2 times as the BSA concentration in the feed, while the concentration of BSA in the concentrated liquid obtained from the conventional membrane concentration method was only 3.2 g/L and 6.4 times as the BSA concentration in the feed; when the conventional membrane concentration method was employed, the transmembrane pressure (TMP) of the system reached the limit value (1.0 MPa) of the equipment after 6.5 hours operation, while when the membrane filtration method of the present application was employed, the TMP slowly increased and was only 20% of that in the conventional membrane concentration method after 6.5 hours. In addition, the test results of membrane resistance after filtration showed that there was essentially no change in the membrane resistance before and after filtration when the membrane concentration method of the present invention was employed, while the membrane resistance increased by more than 20% after filtration when the conventional ultrafiltration concentration was employed. Clearly, the application of the present invention shows a good concentration effect, and can effectively control the membrane fouling and facilitate long-term stable operation during membrane concentration process.

Example 2

The method and equipment used were the same as those in Example 1, while the concentration of BSA in a feed solution ($C_f$) was 0.5 g/L and the permeation flux ($J_v$) of the filtration membrane was $3.745 \times 10^{-6}$ m$^3$/(m$^2$·s). When the TMP increased to 100 KPa and 150 KPa, the concentrated liquid was drawn at a drawing rate of 360 μL/h and 420 μL/h, respectively. At the initial stage of drawing, the TMP under both experimental conditions decreased, and then it could be stabilized at 60 and 107 KPa for a long period of time, respectively, suggesting that membrane fouling was effectively controlled during concentration process and the concentration operation could be stably conducted for a long period of time. After operation for 8 hours, the average concentrations of BSA in the concentrated liquids obtained by drawing were 8.9 and 7.0 g/l, i.e., 17.8 and 14.0 times as that in the feed, respectively.

Example 3

The method and equipment used were the same as those in Example 1, while the concentration of BSA in a feed solution ($C_f$) was 0.5 g/L and the permeation flux ($J_v$) of the filtration membrane was $3.745 \times 10^{-6}$ m$^3$/(m$^2$·s). In order to obtain a concentrated liquid with a higher concentration, an intermittent drawing mode was used to draw the concentrated liquid. The drawing operation started up at a TMP of 100 and 150 KPa and a drawing rate of 360 μL/h and 420 μL/h, respectively. Such operation stopped when the TMP decreased to 60 and 107 KPa respectively. When the TMP again reached the values for initiating the drawing, the concentrated liquid was drawn at the same rates again. The above operations were conducted repeatedly. After operation for 8 hours, the concentrations of BSA in the concentrated liquid obtained by the drawing were 11.8 and 12.4 g/l, i.e., 23.6 and 24.8 times as that in the feed, respectively. Clearly, the multiple intermittent drawing operation mode facilitates the acquirement of a concentrated liquid with a high concentration, the TMP was controllable at the same time, and the average TMP of system was more or less constant.

Example 4

The method and equipment used were the same as those in Example 1, while the concentration of BSA in a feed solution ($C_f$) was 0.5 g/L and the permeation flux ($J_v$) of the filtration membrane was $3.745 \times 10^{-6}$ m$^3$/(m$^2$·s). An intermittent drawing mode was used to draw the concentrated liquid. When the TMP increased to 100 KPa, the concentrated liquid was drawn at a drawing rate of 360 μL/h for a drawing time of 30, 10 or 5 minutes, respectively. The drawing operation stopped after the above predetermined drawing time. When the TMP increased to 100 KPa again, the drawing operation started up again. The above operations were conducted repeatedly. The results showed that when the drawing time was 5 minutes, the concentration of BSA in the concentrated liquid obtained was 34.9 g/L and 69.8 times as that in the feed; when the drawing time was 10 and 30 minutes, the concentrations of BSA in the concentrated liquids obtained were 31.5 and 19.0 g/L, i.e., 63.0 and 38.0 times as that in the feed, respectively. During the entire drawing operation, the TMP was controllable, the average TMP of system was more or less constant, indicating that membrane fouling was effectively controlled during the concentration and a continuous concentration operation could be achieved.

Example 5

Figure 2:
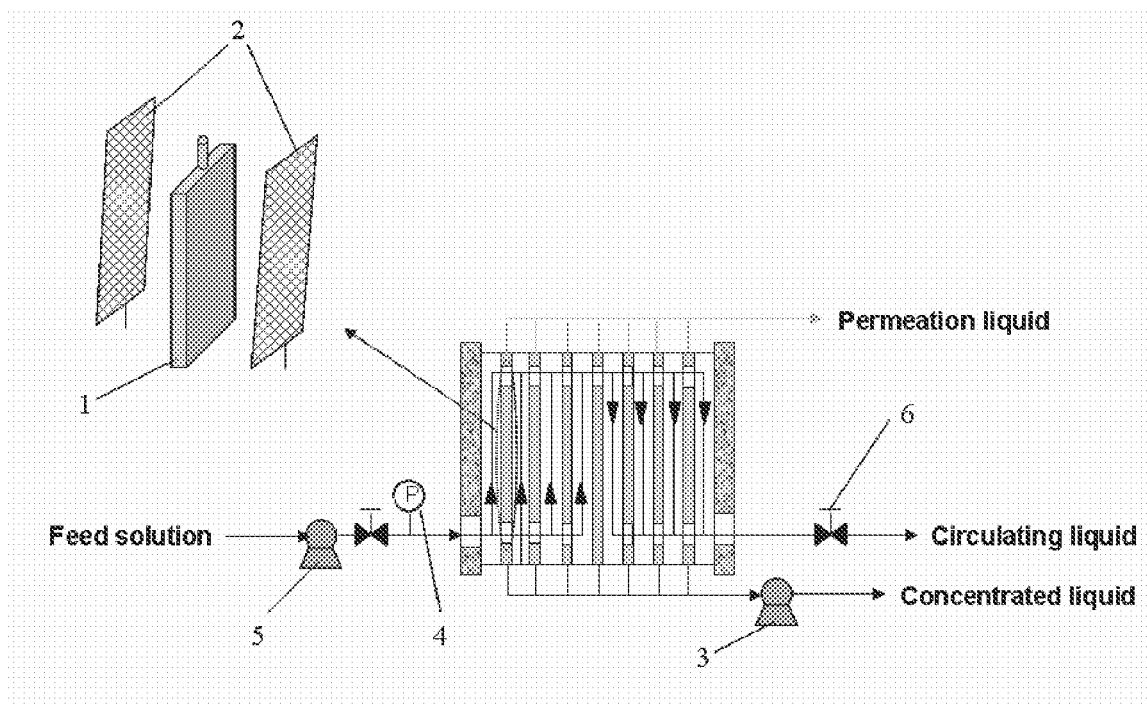
FIG. 2 is a schematic diagram of a plate-and-frame cross-flow membrane filtration device for concentrating biomacromolecules and organic micromolecules utilizing concentration polarization.

Turning to FIG. 2, an equipment for a plate-and-frame cross-flow membrane filtration process of concentrating biomacromolecules and organic micromolecules utilizing concentration polarization comprised: plate membrane elements 1, drawers 2 for drawing a concentrated liquid, a pressure sensor 4, a feeding pump 5, an injection pump or constant flow pump 3, and cut-off valve 6.

The plate-and-frame cross-flow filtration equipment contained three parallel plate membrane elements 1, wherein each of the membrane elements had an effective membrane area of 0.03 m$^2$, and the filtration membrane was a polysulfone ultrafiltration membrane with a molecular weight cut-off of 50 KD (Alfa laval company in Sweden). The drawer 2 for drawing the concentrated liquid was configured in close proximity to the surface of each of said plate membrane elements 1. The drawer 2 made of a hollow plastic or silicone pipe with an external diameter ranging from 0.5 to 1.5 mm had a plate latticed hollow structure having a plurality of holes with a diameter ranging from 0.1 to 0.5 mm at a side thereof towards the filtration membrane surface and connected with a hollow pipe at one end of each drawer. The hollow pipe of each drawer was connected in parallel and extended outside the plate-and-frame cross-flow filtration equipment and connected with the injection pump 3 through a collection pipe. A raw material inlet was set on the plate-and-frame cross-flow filtration equipment, and a pipeline accompanied with a pressure sensor 4 was mounted on the raw material inlet, wherein said pipeline connected with the feeding pump 5. A circulating liquid outlet was set in the filtration device of the plate-and-frame cross-flow filtration equipment, and the outlet connected with a pipeline accompanied with a cut-off valve 6, wherein said pipeline connected with a raw material tank. A permeation liquid outlet was set on each of the plate membrane elements 1. After permeation liquid from each outlet was connected in parallel, it was discharged from the plate-and-frame cross-flow filtration equipment.

A feed solution containing 0.5 g/L of γ-globulin (Mb=156 KD, purity>98%) was fed continuously into the plate-and-frame cross-flow filtration equipment. The TMP of system was maintained at 100 KPa. An intermittent drawing operation mode was employed to draw the concentrated liquid. When the permeation flux of system reached $5.25 \times 10^{-6}$ m$^3$/(m$^2$·s), the concentrated liquid was drawn at a drawing rate of 18 mL/h for a drawing time of 30, 10 or 5 minutes. The drawing operation stopped after the above predetermined drawing time. When the permeation flux again reached $5.25 \times 10^{-6}$ m$^3$/(m$^2$·s), the drawing operation started up again. The above operations were conducted repeatedly. The results showed that when the drawing time was 5 minutes, the concentration of γ-globulin in the concentrated liquid obtained was 25.3 g/L, i.e., 50.6 times as that in the feed; when the drawing time was 10 and 30 minutes, the concentrations of γ-globulin in the concentrated liquids obtained were 22.6 and 13.4 g/L, i.e., 45.2 and 26.8 times as that in the feed, respectively. During the entire drawing operation, the average permeation flux of system was more or less constant at a relatively higher level, indicating that the membrane fouling was effectively controlled during the concentration and a long time concentration operation could be achieved.

Example 6

Figure 3:
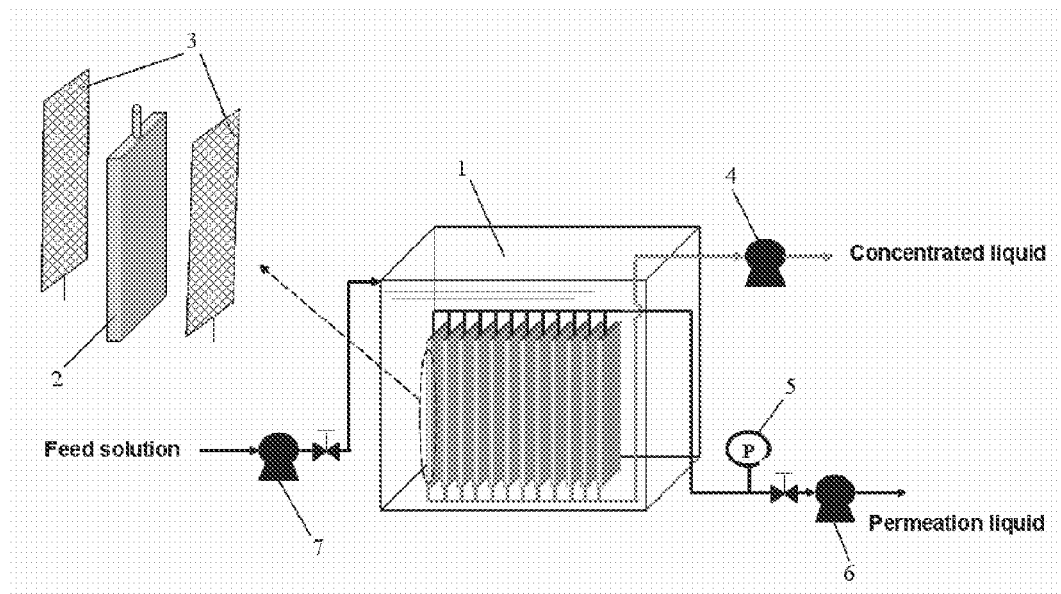
FIG. 3 is a schematic diagram of a plate suction membrane filtration device for concentrating biomacromolecules and organic micromolecules utilizing concentration polarization.

Turning to FIG. 3, an equipment for an a plate suction membrane filtration process for concentrating biomacromolecules and organic micromolecules utilizing concentration polarization comprised: a membrane filtration tank 1, plate membrane elements 2, drawers 3 for drawing concentrated liquid, a pressure sensor 5, a feeding pump 7, an injection pump or a constant flow pump 4, and a sucking pump 5. Three parallel palate membrane elements 2 were configured in the membrane filtration tank 1, wherein each of the membrane elements had an effective membrane area of 0.03 m$^2$, and the filtration membrane was a polysulfone ultrafiltration membrane with a molecular weight cut-off of 50 KD (Alfa laval company in Sweden). The drawer 3 for drawing concentrated liquid was configured in close proximity to the surface of each of said plate membrane elements 2. The drawers 3 made of a hollow plastic or silicone pipe with an external diameter ranging from 0.5 to 1.5 mm had a plate latticed hollow structure having a plurality of holes with a diameter ranging from 0.1 to 0.5 mm at a side thereof towards the filtration membrane surface and connected with a hollow pipe at one end of each drawer. The hollow pipe of each drawer was connected in parallel and extended outside the membrane filtration tank 1 and connected with the injection pump 4 through a collection pipe. A permeation liquid outlet was set on each of the plate membrane elements 2, connected with other permeation liquid outlets in parallel, and then fluidly connected with a pipeline accompanied with the pressure sensor 5 and the sucking pump 6. A raw material inlet was configured on the membrane filtration tank 1, and connected with a pipeline accompanied with the feeding pump 7.

A feed solution containing 0.5 g/L of γ-globulin (Mb=156 KD, purity>98%) was fed continuously into the raw membrane filtration and the plate membrane elements were entirely submerged. The permeation flux of system was maintained at $5.25 \times 10^{-6}$ m$^3$/(m$^2$·s). An intermittent suction operation mode was used to draw the concentrated liquid. When the TMP of system reached 100 Kpa, the concentrated liquid was drawn at a drawing rate of 24 mL/h for a drawing time of 30, 10 or 5 minutes. The drawing operation stopped after the above predetermined drawing time. When the TMP again reached 100 KPa, the drawing operation started up again. The above operations were conducted repeatedly. The results showed that when the drawing time was 5 minutes, the concentration of γ-globulin in the concentrated liquid obtained was 27.4 g/L, i.e., 54.8 times as that in the feed; when the drawing time was 10 and 30 minutes, the concentrations of γ-globulin in the concentrated liquids obtained were 23.9 and 15.0 g/L, i.e., 47.8 and 30.0 times as that in the feed. During the entire drawing operation process, the TMP was controllable and the average TMP of system was more or less constant, suggesting that the equipment could run for a long period of time.

Example 7

Figure 4:
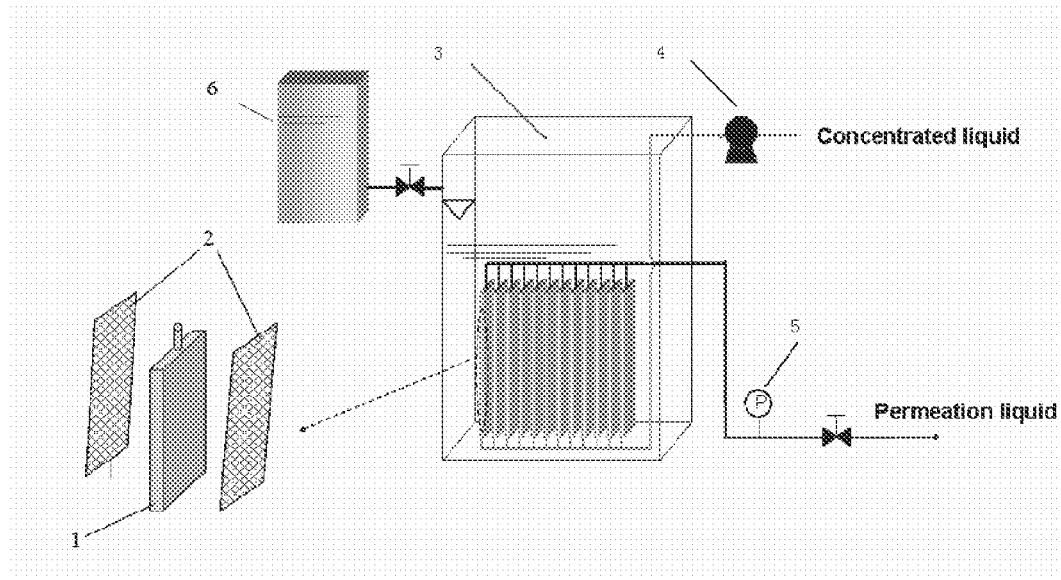
FIG. 4 is a schematic diagram of a plate hydraulic static press membrane filtration device for concentrating biomacromolecules and organic micromolecules utilizing concentration polarization.

Turning to FIG. 4, an equipment for an a plate hydraulic static press membrane filtration process for concentrating biomacromolecules and organic micromolecules utilizing concentration polarization comprised: plate membrane elements 1, drawers 2 for drawing concentrated liquid, a membrane filtration tank 3, an injection pump or a constant flow pump 4, a pressure gauge 5 and a high level tank 6.

Three parallel palate membrane elements 1 were configured in the membrane filtration tank 3, wherein each of the membrane elements 1 had an effective membrane area of 0.03 m$^2$, and the filtration membrane was a polysulfone unltrfiltration membrane with a molecular weight cut-off of 50 KD (Alfa laval company in Sweden). The drawer 2 for drawing concentrated liquid was configured in close proximity to the surface of each of said plate membrane elements 1. The drawers made of hollow plastic or silicone pipes having an external diameter ranging from 0.5 to 1.5 mm had a plate latticed hollow structure having a plurality of holes with a diameter ranging from 0.1 to 0.5 mm at a side thereof towards the filtration membrane surface and connected with a hollow pipe at the end of each drawer. The hollow pipe of each drawer was connected in parallel and extended outside the membrane filtration tank 3, and connected with the injection pump 4 through a collection pipe. A permeation liquid outlet was configured on each of the plate membrane elements 1, connected with other permeation liquid outlets in parallel, and then fluidly connected with a pipeline accompanied with the pressure gauges. A raw material inlet was set on the membrane filtration tank 3, and connected via a pipeline with the high level tank 6. The TMP was provided by a hydrostatic water head in the membrane filtration tank 3.

A feed solution containing 0.5 g/L of γ-globulin (Mb=156 KD, purity>98%) was fed continuously into the membrane filtration tank and the plate membrane elements were entirely submerged. The position of the membrane elements were controlled to make the pressure gauge show 10 Kpa, and the initial permeation flux of system was $0.98 \times 10^{-6}$ m$^3$/(m$^2$·s). An intermittent drawing operation mode was employed to draw the concentrated liquid. When the permeation flux of system reached $0.45 \times 10^{-6}$ m$^3$/(m$^2$·s), the concentrated liquid was drawn at a drawing rate of 24 mL/h for a drawing time of 30, 10 or 5 minutes. The drawing operation stopped after the above predetermined drawing time. When permeation flux again reached $0.98 \times 10^{-6}$ m$^3$/(m$^2$·s), the drawing operation started up again. The above operations were conducted repeatedly. The results showed that when the drawing time was 5 minutes, the concentration of γ-globulin in the concentrated liquid obtained was 22.5 g/L, i.e., 45.0 times as that in the feed; when the drawing time was 10 and 30 minutes, the concentration of γ-globulin in the concentrated liquid obtained was 20.6 and 12.0 g/L, i.e., 41.2 and 24.0 times as that in the feed.

In view of the shortcomings existing in conventional membrane concentration processes, such as severe membrane fouling, easy to inactivate biomacromolecules, frequent cleaning of membrane and difficult to operate continuously, the present invention provides a continuous membrane separation method utilizing the characteristics of concentration polarization layer such as rapid formation and high solute concentration. This method comprises: adjusting the thickness of a concentration polarization layer on membrane surface and the concentration and distribution of solutes in the concentration polarization layer by controlling the operation conditions; and drawing the concentrated liquid in concentration polarization layer by using a drawer for drawing the concentrated liquid. When such method is employed, a desired solution with high concentration can be obtained, the potential membrane fouling can be significantly lessened, and a continuous concentration process can be achieved. The method for concentrating biomacromolecules and organic micromolecules utilizing concentration polarization provided by the present invention skillfully solves the twinborn problems of concentration polarization and membrane fouling during membrane concentration process and reforms the principle and implementation of membrane concentration techniques, and the advantages of membrane techniques such as high efficacy, energy saving, simple process and easy operation etc. are sufficiently exhibited in the system of the present invention.

After reading the present invention, a person skilled in the art can conceive many improvements and other embodiments of the present invention and can predict the advantages thereof according to the teachings of the present invention. Hence, it should be understood that the embodiments and examples disclosed herein are not intended to restrict the present invention, and the improvements and other embodiments are also included in scope as claimed in the claims. Although some specific terms are used in the text, they are used in general and descriptive meanings, not intended to restrict the scope of the claims.

What is claimed is:

1. A membrane separation equipment, comprising a separation membrane and a drawer, wherein the drawer is configured to remove at least part of a concentration polarization layer from a separation side of the separation membrane during membrane separation process, wherein the drawer comprises a hollow pipe structure having at least one opening, a section with an opening of the hollow pipe structure is over a feed-side surface of the separation membrane, the opening is configured to face the feed-side surface of the separation membrane and be located inside the concentration polarization layer at the separation side of the separation membrane, allowing at least part of the concentration polarization layer to pass through the opening, enter into the hollow pipe structure, and be removed from the separation membrane along a direction essentially normal to the separation membrane.

2. The membrane separation equipment according to claim 1, wherein the relative distance and relative position between the drawer and the separation membrane is fixed or adjustable.

3. The membrane separation equipment according to claim 1, wherein the drawer together with the separation membrane form a membrane module.

4. The membrane separation equipment according to claim 1, wherein the at least one opening of the hollow pipe structure of the drawer is one or more holes with essential round, polygonal or abnormal shape.

5. The membrane separation equipment according to claim 1, wherein the at least one opening of the hollow pipe structure of the drawer has a size ranging from 0.01 to 5 mm, preferably from 0.1 to 2.0 mm, more preferably from 0.1 to 0.5 mm.

6. The membrane separation equipment according to claim 1, wherein the separation membrane is a tabular, plate-and-frame, spiral, tubular or hollow fiber separation membrane.

7. The membrane separation equipment according to claim 6, the separation membrane is a nanofiltration membrane, ultrafiltration membrane or microfiltration membrane made of celluloses, poly(ether sulfone)s, polysulfones, polyolefins, polyamides, polypiperazidines, metals, glasses or ceramics.

8. A drawer for drawing a concentration polarization layer from a separation side of a separation membrane during a membrane separation process, wherein the drawer comprises a hollow pipe structure having at least one opening, a section with an opening of the hollow pipe structure is over a feed-side surface of the separation membrane, and the opening is configured to face the feed-side surface of the separation membrane and be located inside the concentration polarization layer at the separation side of the separation membrane, allowing at least part of the concentration polarization layer to pass through the opening, enter into the hollow pipe structure, and be removed from the separation membrane along a direction essentially normal to the separation membrane.

9. The drawer according to claim 8, wherein the drawer further comprises a channel connecting with the hollow pipe structure, and the channel is configured to allow the concentration polarization layer in the hollow pipe structure to leave the hollow pipe structure.

10. The drawer according to claim 8, wherein the drawer further comprises a connection means, and the connection means is configured to allow the distance and relative position between the drawer and the separation membrane to be fixed or adjustable.

11. The drawer according to claim 8, wherein the drawer may essentially cover at least part of a separation surface of the separation membrane in a fixed or movable manner.

12. The drawer according to claim 8, wherein the section with the at least one opening of the hollow pipe structure is essentially in planar, cruciate, spiral, latticed, suspending needle shape or a combination thereof.

13. The drawer according to claim 8, wherein the section with the at least one opening of the hollow pipe structure as a whole may substantially match with the surface of the separation membrane.

14. The drawer according to claim 8, wherein the hollow pipe structure has more than one opening, and these openings may be located regularly or randomly on the surface of the hollow pipe structure of said drawer that faces toward the separation membrane.

15. The drawer according to claim 8, wherein the at least one opening of the hollow pipe structure of the drawer may be a hole in essential round, slit, polygonal or abnormal shape.

16. The drawer according to claim 8, wherein the at least one opening has a size ranging from 0.01 to 5 mm.

17. The membrane separation equipment according to claim 1, wherein the membrane separation equipment is a dead-end filtration equipment.

\* \* \* \* \*